(12) United States Patent
Daly et al.

(10) Patent No.: US 8,366,860 B2
(45) Date of Patent: Feb. 5, 2013

(54) LASER WELDING METHOD

(75) Inventors: Paul Desmond Daly, Troy, MI (US);
Bobbye Kaye Baylis Whitenton,
Harrow (CA)

(73) Assignee: Mahle International GmbH (DE)

( * ) Notice: Subject to any disclaimer, the term of this patent is extended or adjusted under 35 U.S.C. 154(b) by 590 days.

(21) Appl. No.: 12/518,231

(22) PCT Filed: Dec. 7, 2007
(Under 37 CFR 1.47)

(86) PCT No.: PCT/EP2007/063511
§ 371 (c)(1),
(2), (4) Date: Feb. 8, 2010

(87) PCT Pub. No.: WO2008/068328
PCT Pub. Date: Jun. 12, 2008

(65) Prior Publication Data
US 2011/0094673 A1 Apr. 28, 2011

Related U.S. Application Data

(60) Provisional application No. 60/869,193, filed on Dec. 8, 2006, provisional application No. 60/913,014, filed on Apr. 20, 2007.

(51) Int. Cl.
*B32B 37/06* (2006.01)
(52) U.S. Cl. .................................... 156/272.8
(58) Field of Classification Search .............. 156/272.2, 156/272.8
See application file for complete search history.

(56) References Cited

U.S. PATENT DOCUMENTS

| 5,749,414 A | 5/1998 | Damsohn et al. |
| 6,592,239 B1 * | 7/2003 | Akiyama et al. ............. 362/267 |
| 2001/0028568 A1 * | 10/2001 | Akiyama et al. ............. 362/520 |
| 2005/0000641 A1 * | 1/2005 | Hartmann et al. ......... 156/272.8 |
| 2006/0086457 A1 * | 4/2006 | Ohshita et al. ............ 156/272.8 |
| 2006/0124178 A1 * | 6/2006 | Leiser et al. ................. 137/590 |

FOREIGN PATENT DOCUMENTS

| DE | 4409255 | 9/1995 |
| DE | 10109594 | 9/2001 |
| EP | 0483569 | 10/1991 |
| WO | WO-2007/065271 | 6/2007 |

OTHER PUBLICATIONS

English abstract provided for DE-4409255.

* cited by examiner

*Primary Examiner* — Daniel McNally
(74) *Attorney, Agent, or Firm* — Rader, Fishman & Grauer PLLC (57) ABSTRACT

The invention relates to a method for laser welding at least two components made of plastic, particularly a pipe and a carrier plate, wherein the first component at least in certain regions has a relatively high permeability for the laser beam used during laser welding. The second component at least in certain regions has a relatively low permeability for the laser beam used during laser welding. A compact design of the components can be achieved if the laser beam reaches the respective weld location by means of refraction and/or reflection during laser welding.

20 Claims, 10 Drawing Sheets

LASER WELDING METHOD

CROSS-REFERENCE TO RELATED APPLICATIONS

This application claims priority to U.S. Provisional Patent Applications 60/869,193 filed on Dec. 8, 2006, 60/913,014 filed on Apr. 20, 2007 and PCT/EP2007/063511 filed on Dec. 7, 2007, which are hereby incorporated by reference in their entireties.

TECHNICAL FIELD

The present invention relates to a method for laser welding at least two components made of plastic, in particular a pipe and a carrier plate.

BACKGROUND

For a plurality of different applications it can be required to weld two plastic components together. For example, two housing parts can be welded together. For the manufacturing of plastic heat exchangers which, for example, are used for cooling of charge air in a charged internal combustion engine, it can be required to weld a carrier plate to each of the ends of a plurality of individual pipes. Here, in extremely confined space, a plurality of weld joints have to be carried out which, in addition, have to be relatively sealed.

From WO 2007/065271 A1 it is known for a heat exchanger to provide plastic pipes with a radially projecting flange which abuts planar against a carrier plate. At least in the region of the flange, the plastic pipes have a relatively high permeability for a laser beam used during laser welding. In contrast to that, the carrier plate has a relatively low permeability for the laser beam. The laser beam can now pass through the flange perpendicular to the carrier plate and is absorbed only when it reaches the material of the carrier plate, whereby at the interface between the carrier plate and the flange, the desired weld location can be formed. For the implementation of the known method, a relatively large installation space is necessary since the flange has a considerably bigger diameter than the respective pipe.

From U.S. Pat. No. 5,749,414, a method for laser welding two aluminum parts is known. Here, for a heat exchanger, one pipe, respectively, is inserted into a carrier plate until the pipe is flush with the carrier plate. Then, the front-side end of the pipe can be welded to the plate by means of a laser beam.

SUMMARY

The present invention is concerned with the problem to propose, for a method of the aforementioned type, an improved embodiment which is in particular characterized in that it requires a relatively small space, whereby in particular for a heat exchanger, a compact design can be realized.

This problem is solved according to the invention by means of the subject matters of the independent claims. Advantageous embodiments are subject matter of the dependent claims.

The invention is based on the general idea to deflect the laser beam during the welding operation by means of refraction and/or reflection to the respective weld location. With this approach, with the laser beam, also weld locations can be reached which, for example, can not be reached directly with the laser beam due to the existing installation space situation. The invention hence allows the execution of welding processes which can not be realized with conventional welding methods of linear direct impingement by means of the laser beam.

Particularly advantageous for this is an embodiment in which the component permeable for the laser beam has at least one reflector face which deflects the laser beam by means of reflection to the respective weld location. For this, the reflector face can be arranged on the respective component in such a manner that it directs the laser beam impinging from outside on the reflector face through a region of the component and to the respective weld location. Alternatively, the respective reflector face can also be formed in such a manner that the laser beam impinges from inside onto the reflector face and then reaches the respective weld location from inside the component. The reflector face is hence an integral part of the respective component. Such a reflector face can work, for example, with total reflection so that the reflection of the laser beam is adjustable by means of the respective angle of incidence. In addition, the respective reflection face can have a reflective coating. For example, the respective component can be metalized, at least in the region of the respective reflector face, with a suitable metal, or it can be galvanized.

In another embodiment, the component permeable for the laser beam can be formed with at least one refraction face so that the laser beam impinging from outside onto the refraction face penetrates at the refraction face into the respective component and then reaches the respective weld location from inside the component. Hence, by means of a suitable adjustment of the angle of incidence, the laser beam can be directed to the desired weld location.

In an alternative embodiment, the problem on which the invention is based is solved in that both components have an absorbing effect for the laser beam, in particular a semi-absorbing effect. The two components are positioned to each other in such a manner that between the components, a gap exists with a predetermined gap width. The laser beam can be irradiated into the gap parallel to a gap extension running transverse to the gap width. For this, the dimensioning of the gap is selected and adapted for the respective laser beam such that the two components' wall sections opposing each other within the gap heat up high enough, due to their semi-absorbing characteristic, that they melt and melt together, whereby the gap closes.

Further important features and advantages of the invention arise from the sub-claims, the drawings, and the associated description of the figures based on the drawings.

It is to be understood that the above mentioned and the following features yet to be described are applicable not only in the respective mentioned combination, but also in other combinations or on its own without departing from the scope of the present invention.

Preferred exemplary embodiments of the invention are shown in the drawings and are explained in the following description in more detail, wherein the same reference numbers refer to the same, or similar, or functionally identical components.

BRIEF DESCRIPTION OF THE DRAWINGS

Schematically, in the figures:

FIG. 9 shows an enlarged top view on a reflector.

DETAILED DESCRIPTION

The method for laser welding described hereinafter is principally applicable for connecting two arbitrary plastic components. Of particular interest, however, is the manufacturing of plastic heat exchangers which, for example, can be used as charge air coolers. Accordingly, the one component concerns preferably a pipe made of plastic while the other component concerns preferably a carrier plate made of plastic. Typically, a plurality of such pipes is fixed connected with at least one of their ends to such a carrier plate by means of the laser welding method.

Figure 1:
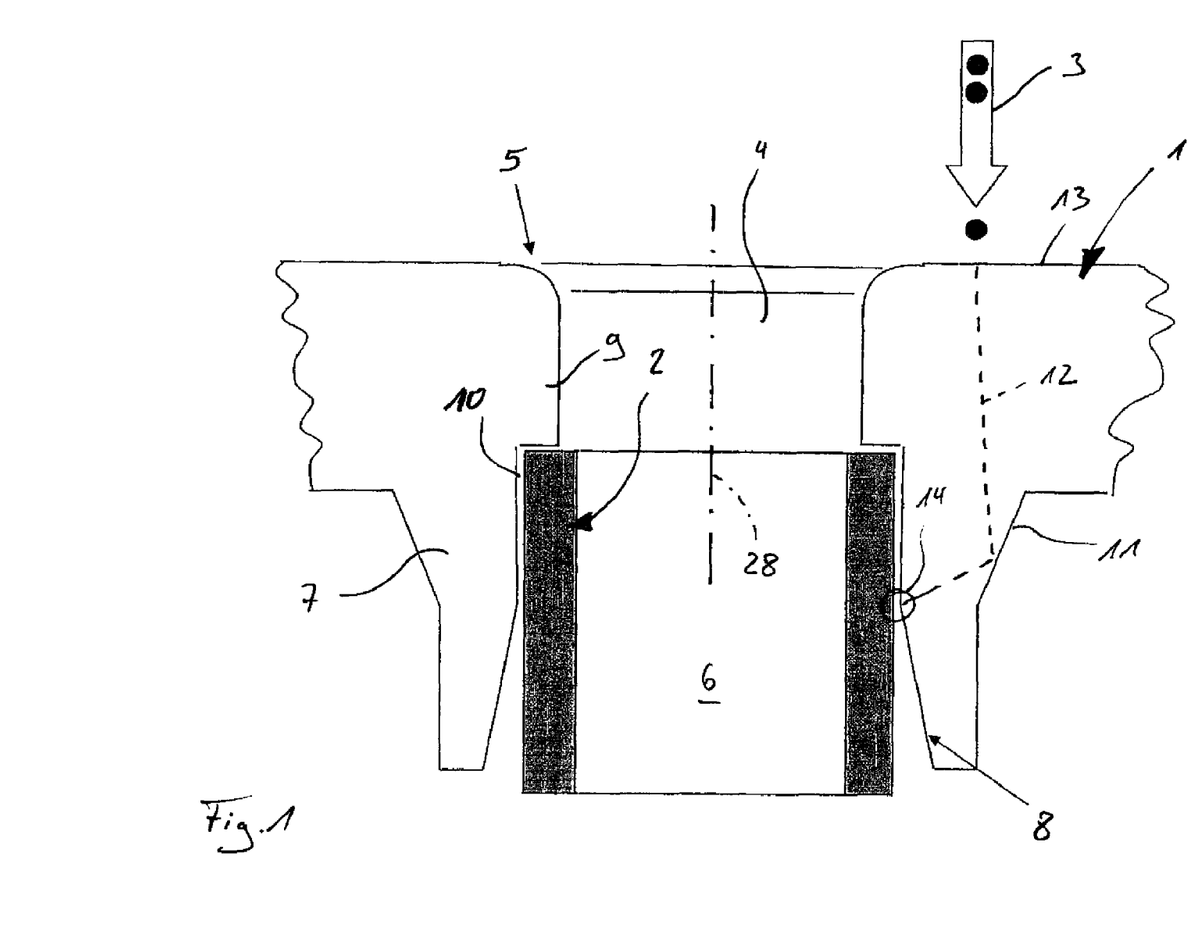
FIG. 1 shows a cross-section of two components in a region in which a weld joint is to be produced.

According to FIG. 1, by means of the laser welding method, thus a first component 1 and a second component 2 can be fixed connected to each other. The first component 1 concerns purely exemplary and without limitation of the generality, for example, a carrier plate 1, while the second component 2, again without limitation of the generality, concerns, for example, a pipe 2. Both components 1, 2 are made here of plastic. The plastic of the carrier plate 1 is preferably selected such that it has a relatively high permeability for a laser beam 3 which is used for the laser welding and which is symbolically indicated here by an arrow. Principally, the carrier plate 1 can be designed permeable or transparent for the laser beam 3. In contrast to that, the pipe 2 has a relatively low permeability for the laser beam 3; in particular, the pipe 2 is designed in an absorbing manner for the laser beam 3. This can be achieved for plastic, for example, in that the plastic material is colored black, in particular with carbon particles. The permeability for the laser beam 3, however, is higher at the carrier plate 1 than for the pipe 2, at least in the embodiments of the FIGS. 1 to 12.

According to the invention, the laser beam does not reach the respective weld location directly, but by means of refraction or reflection, respectively. This results in advantages with respect to the required installation space.

FIG. 1 shows concretely a through-opening 4 with a rounded transition area 5 incorporated into the carrier plate 1. The through-opening 4 communicates with an interior 6 of the pipe 2. The pipe 2 is axially inserted into a pipe receptacle 7 which can be provided with a lead-in chamfer 8 to facilitate the insertion process. In the region of the through-opening 4, the carrier plate 1 has a collar 9 which projects radially inwards and against which the pipe 2 abuts axially in the inserted condition. Radially between the pipe 2 and the receptacle 7, an annular gap 10 can be seen which, however, can vary dependent on the tolerance. In the region of this annular gap 10, an annular, continuous circumferential weld joint between the pipe 2 and the carrier plate 1 is to be produced. Except for the embodiment introduced with reference to FIG. 14, the annular gap 10 is not required. A press fit of the pipe 2 in the receptacle 7 is preferred, but can not always be achieved, dependent on the tolerances. The illustrations are hence to be understood as not being to scale.

For this purpose, the carrier plate 1 has at least one reflector face 11. The latter is formed by an appropriately designed region of the outer contour of the carrier plate 1, here in the region of the receptacle 7. First, corresponding to a broken line which represents a beam path 12, the laser beam 3 can impinge parallel to the longitudinal direction of the pipe 2 onto the carrier plate's 1 outer side 13 facing away from the pipe 2. Due to the transparency of the carrier plate 1, at first, the laser beam can extend within the carrier plate 1 until it hits the reflector face 11. The latter is formed by means of the media transition between the material of carrier plate 1 and the surrounding area, typically air, and can work, for example, with total reflection. With respect to the transmission direction of the laser beam 3, the reflector face 11 is provided accordingly with a certain inclination which is selected such that at impinging of the laser beam 3 on the reflector face 11, a total reflection of the laser beam 3 takes place so that the latter is deflected in direction towards the pipe 2. There, the laser beam 3 reaches the respective weld location which is indicated here by a circle and denoted with 14. In the region of this weld location 14, the laser beam 3 then impinges on the absorbing material of the pipe 2, whereby the heat for melting the plastic of the pipe 2 and the plastic of the plate 1 is released. Corresponding to the rotationally-symmetric shape of the pipe 2, the laser beam 3 is guided about the longitudinal center axis 28 in a rotating manner until a continuous weld seam exists. Accordingly, also the reflector face 11 is formed rotationally-symmetric with respect to the longitudinal center axis 28 of the pipe 2.

In the embodiment shown in FIG. 1, the laser beam 3 hence impinges from inside on the reflector face 11 and reaches the respective weld location 14 from inside the carrier plate 1.

Figure 2:
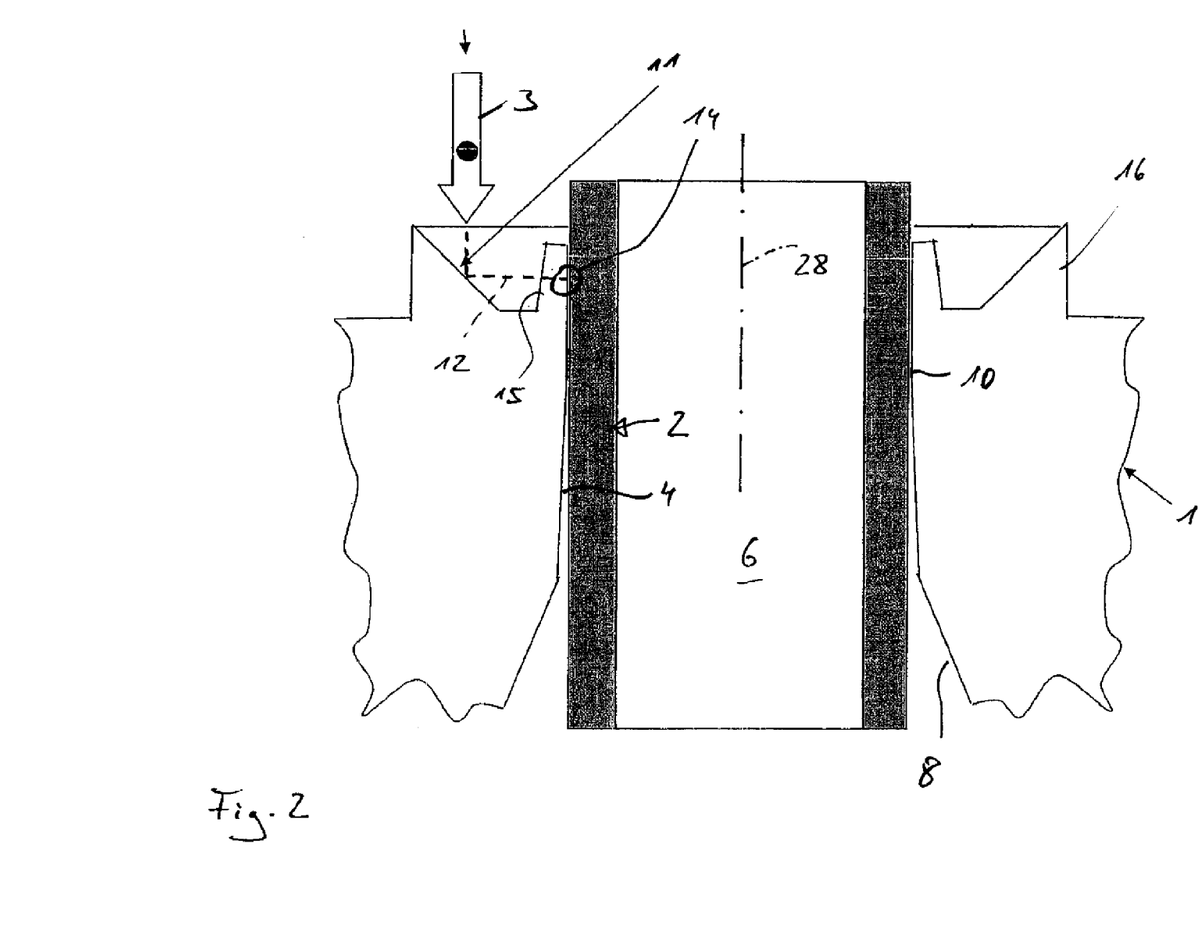
FIG. 2 shows a view as in FIG. 1, but for a different embodiment.

FIG. 2 shows another embodiment in which the laser beam 3 impinges from outside on the reflector face 11 and then passes through a region 15 of the carrier plate 1 and arrives at the respective weld location 14. The mentioned region 15 is formed here by means of an annular collar which melts during producing the weld seam and generates the weld joint with the pipe 2. In the example, for implementation of this reflector face 11, on the carrier plate 1, an annular reflector region 16 is formed which encloses or borders, respectively, the respective through-opening 4. The pipe 2 inserted in the through-opening 4 penetrates the reflector region 16 and abuts against the collar 15. On a side facing towards the pipe 2, the reflector region 16 has a reflector face 11 which, in particular, is formed rotationally-symmetric with respect to the longitudinal center axis 28 of the pipe 2.

Figure 3:
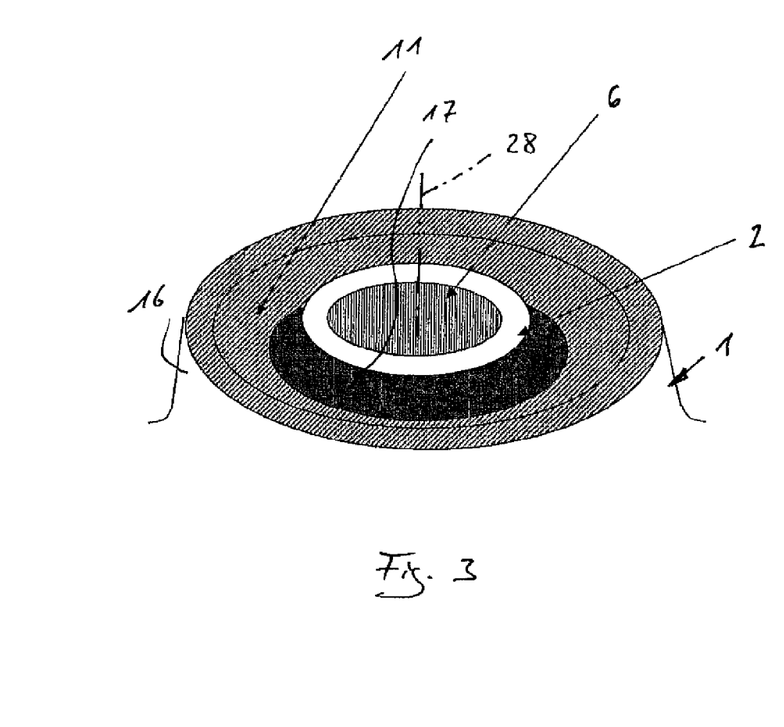
FIG. 3 shows a perspective view of the embodiment according to FIG. 2.

FIG. 3 shows in a perspective view the configuration according to FIG. 2 after producing a circular weld seam 17 into which the collar 15 has substantially completely transformed. Also shown are the reflector face 11 and the pipe 2, which is connected with the carrier plate 1 by means of the weld seam 17.

To be able to improve the reflection effect of the reflector faces 11, it is principally possible to apply a reflective coating in a suitable manner onto the reflector face 11. For example, a reflective layer can be metalized, lacquered, sprayed, or galvanized. Principally, the reflection of the laser beam 3 on the reflector face works also with total reflection, without additional measures to apply a reflective coating.

Figure 4:
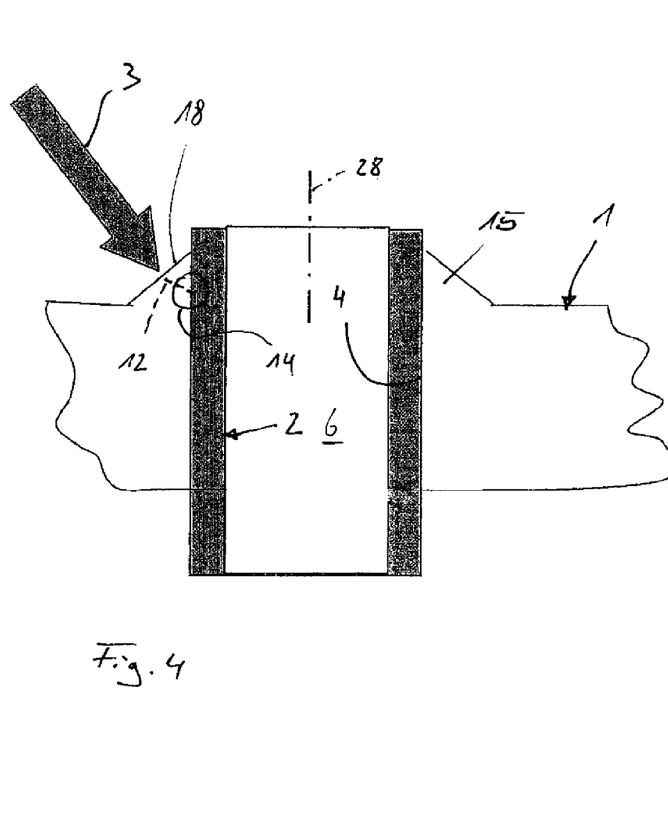
FIG. 4 shows a further sectional view as in FIG. 1 but for a different embodiment.

In the variant shown in FIG. 4, instead of a reflector face 11, at least one refraction face 18 is provided. The latter is also formed on the carrier plate 1 and is characterized in that the laser beam 3 penetrates at this refraction face 18 from outside into the material of the carrier plate 1, thereby changing its direction, and then runs in its new direction within the carrier plate 1 to the respective weld location 14. By a suitable selection of the inclination of the refraction face 18 and by a corresponding selection of the angle of inclination of the laser beam 3 on this refraction face 18, the laser beam can be systematically directed within the carrier plate 1 to the respective weld location 14. Advantageously, this refraction face 18 extends also rotationally-symmetric to the longitudinal center axis 28 of the pipe 2.

In the embodiments of the FIGS. 1 to 4, the reflector faces 11 or the refraction face 18, respectively, are each arranged on the carrier plate 1 in such a manner that each of them is assigned exactly to one pipe 2.

The FIGS. 5 to 9 now describe embodiments in which a reflector 19 is used by means of which a plurality of different weld locations 14 can be reached which, in addition, can be arranged on different pipes 2. According to FIG. 5, in the shown section, for example of a heat exchanger 27, five pipes 2 are illustrated in a simplified manner. Furthermore, on the carrier plate 1, two reflectors 19 are provided. The laser beams 3 can reach the reflectors 19 sideways, hence inclined with respect to a perpendicular direction parallel to the longitudinal center axis 28 of the pipes 2. By changing the angles of inclination as well as by irradiating different reflector faces 11 on the reflectors 19, a plurality of different weld locations 14 can be achieved on a plurality of pipes 2, which allows the production of the desired weld joints even in confined space conditions.

Figure 5:
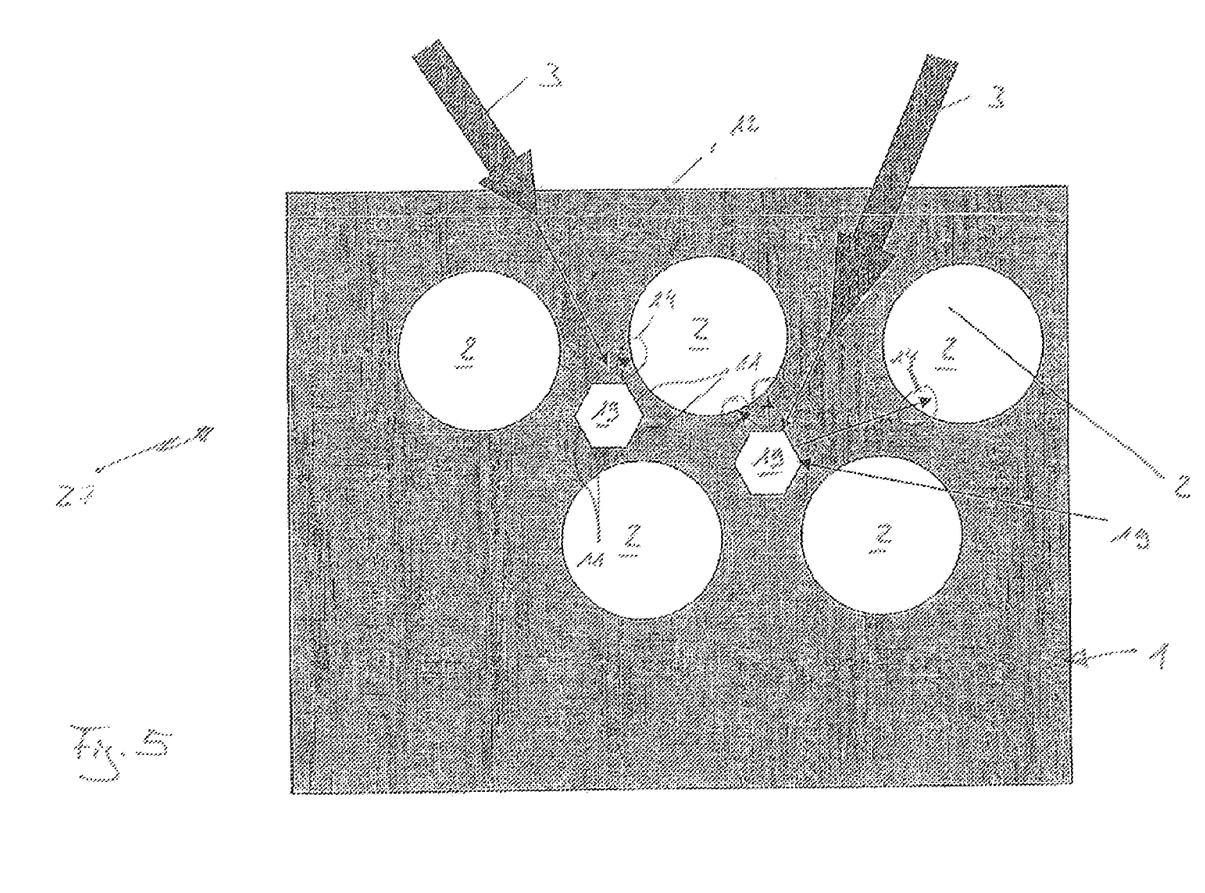
FIG. 5 shows a top view on a component which is to be connected by means of weld joints with a plurality of components.

In the embodiment shown in FIG. 5, the respective reflector 19 has, for example, a honeycomb structure and has accordingly six reflector faces 11 which are located on the outer side and by means of which a plurality of different weld locations 14 can be reached. Here, each of the reflector faces 11 can extend perpendicular to the plane of the carrier plate 1.

Figures 6, 7:
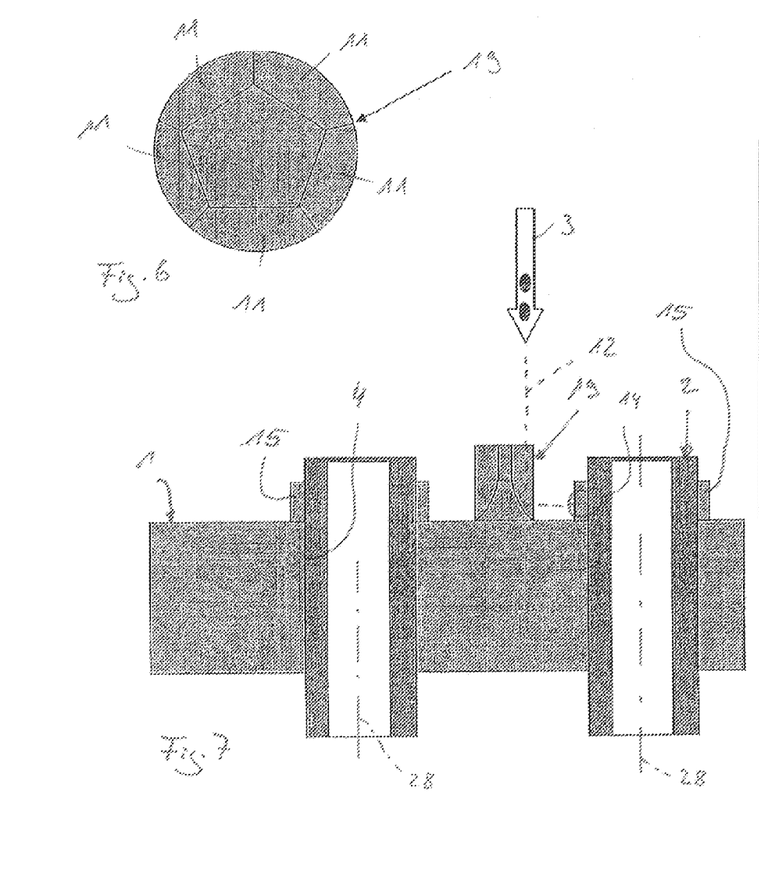
FIG. 6 shows a top view of a reflector.
FIG. 7 shows a sectional view of the components in the region of a reflector.

In contrast to that, FIG. 6 shows an enlarged illustration of a prismatic reflector 19 which has five angled reflector faces 11. According to FIG. 7, with such a reflector 19, the laser beam 3 can principally impinge perpendicular to the carrier plate 1 onto the reflector 19. The respective reflector face 11 then causes the desired deflection towards the respective weld location 14. In the example, in the region of each of the through-openings 4, the carrier plate 1 is provided again with a collar 15. The collar 15 can principally be an integral part of the carrier plate 1. In principal, it is also possible to attach the collar 15 as a separate component. At least in the region of this collar 15, the carrier plate 1 is permeable for the light of the laser beam 3. The collar 15 more or less melts during the generation of the weld seam and provides for the desired connection between pipe 2 and carrier plate 1.

Figure 8:
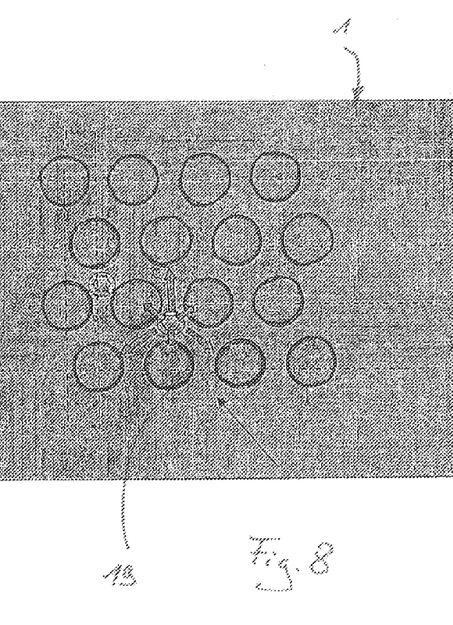
FIG. 8 shows a top view as in FIG. 5, but for a different embodiment.
Figure 10:
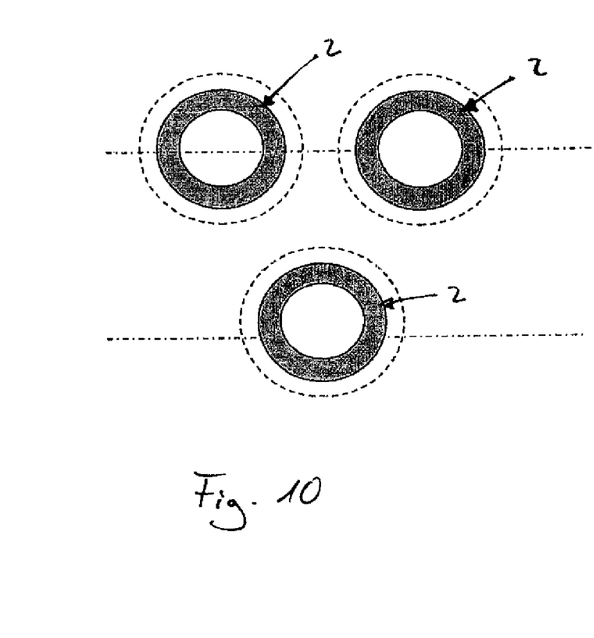
FIG. 10 shows a top view as in FIG. 8, but for a different embodiment.
Figure 11:
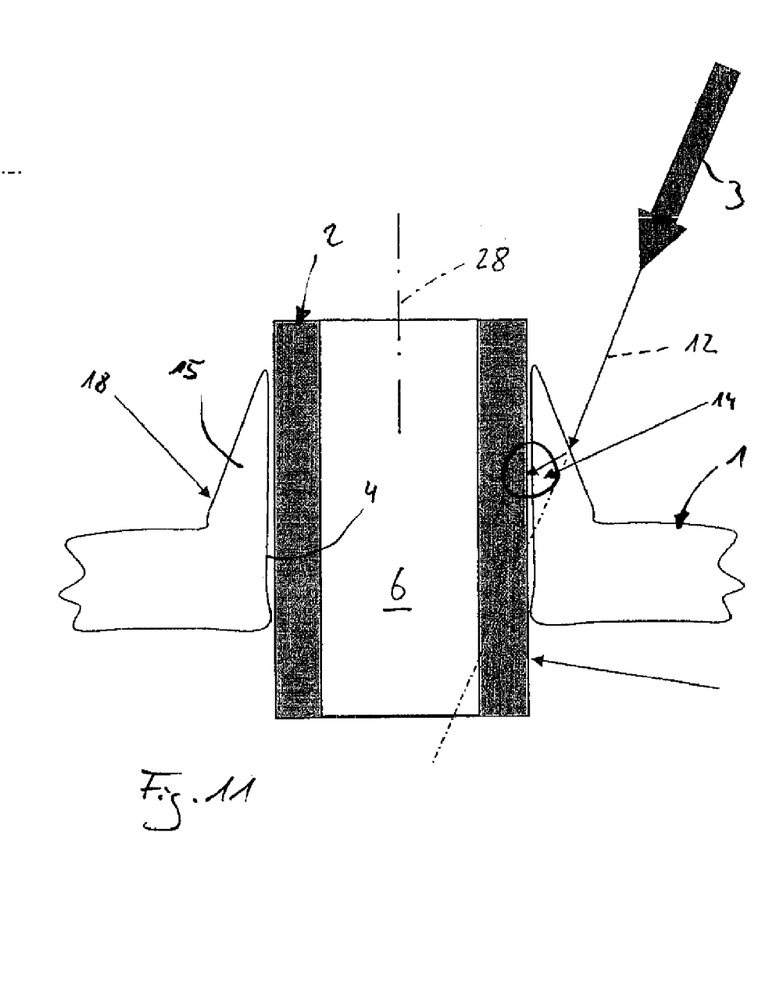
FIG. 11 shows a sectional view as in FIG. 1, but for a different embodiment.

According to FIG. 8, by means of the respective reflector 19, a plurality of weld locations 14 and, in particular, a plurality of pipes 2 can be reached to weld them to the carrier plate 1. It is clear that for forming continuous uninterrupted weld seams, relative movements are necessary. For this, the laser beam 3 can be moved relative to the carrier plate 1. According to FIG. 8, a plurality of such reflectors 19 can be provided to weld a plurality of pipes 2 to the carrier plate 1.

The reflectors 19 principally can be integral parts of the carrier plate 1. Furthermore, it is also possible to prepare the reflectors 19 separately from the respective carrier plate 1 and to attach them to the respective carrier plate 1. In doing so, the reflectors 19 can be attached permanently to the carrier plate 1. It is also possible to attach the reflectors only temporarily to the carrier plate 1, namely, in particular, only for the welding process.

FIG. 9 illustrates that by changing the angle of incidence with which the laser beam 3 impinges on the respective reflector face 11, it is possible to reach different weld locations 14 with the laser beam 3. It can be observed that, at the same time, the path length in the run 12 of the respective laser beam 3 also changes. Also, the angle of incidence changes with which the respective laser beam 3 finally impinges within the respective weld location 14 on the absorbing material of the pipe 2. Hereby, the absorption effect and hence the heat development within the different weld locations 14 can occur differently. To be able to obtain a uniform weld seam along the circumference of the respective pipe 2, it is now possible to carry out the welding method in such a manner that the laser beam 3 can be adapted with respect to its power to the light path and/or the beam angle. For example, the power of the laser beam can be adjusted by means of the pulse frequency and by means of the amplitude. The welding parameters which thereby can be set are preferably the welding temperature and also the exposure time of the laser beam 3 at the respective weld location 14.

FIGS. 10, 11, and 12 show again embodiments in which on the carrier plate 1, a refraction face 18 is formed for the respective pipe 12. According to the configuration shown in FIG. 10, the individual adjacent pipes 2 can be positioned relatively close to each other, whereby a compact design can be realized. According to FIGS. 11 and 12, the laser beam 3 can be transmitted with a relatively large angle with respect to the plane of the carrier plate 1. In the embodiment shown in FIG. 12, the laser beam 3 is oriented substantially perpendicular to the plane of the carrier plate 1, hence parallel to the longitudinal center axis 28 of the pipe 2. Upon impinging on the rotationally-symmetric and conical or tapered refraction face 18, the laser beam 3 penetrates along its run 12 into the material of the carrier plate 1, namely into the collar 15 which is provided on the carrier plate 1 for forming the refraction face 18 and which encloses the respective through-opening 4. At the media transition at the refraction face 18, the desired refraction of the laser beam 3 takes place, whereby the transmission direction of the same changes. In the shown example, the laser beam 3 is refracted or deflected, respectively, in direction towards the pipe 2. Within the material of the collar 15 or the carrier plate 1, respectively, the laser beam 3 then extends to the respective weld location 14.

Figure 12:
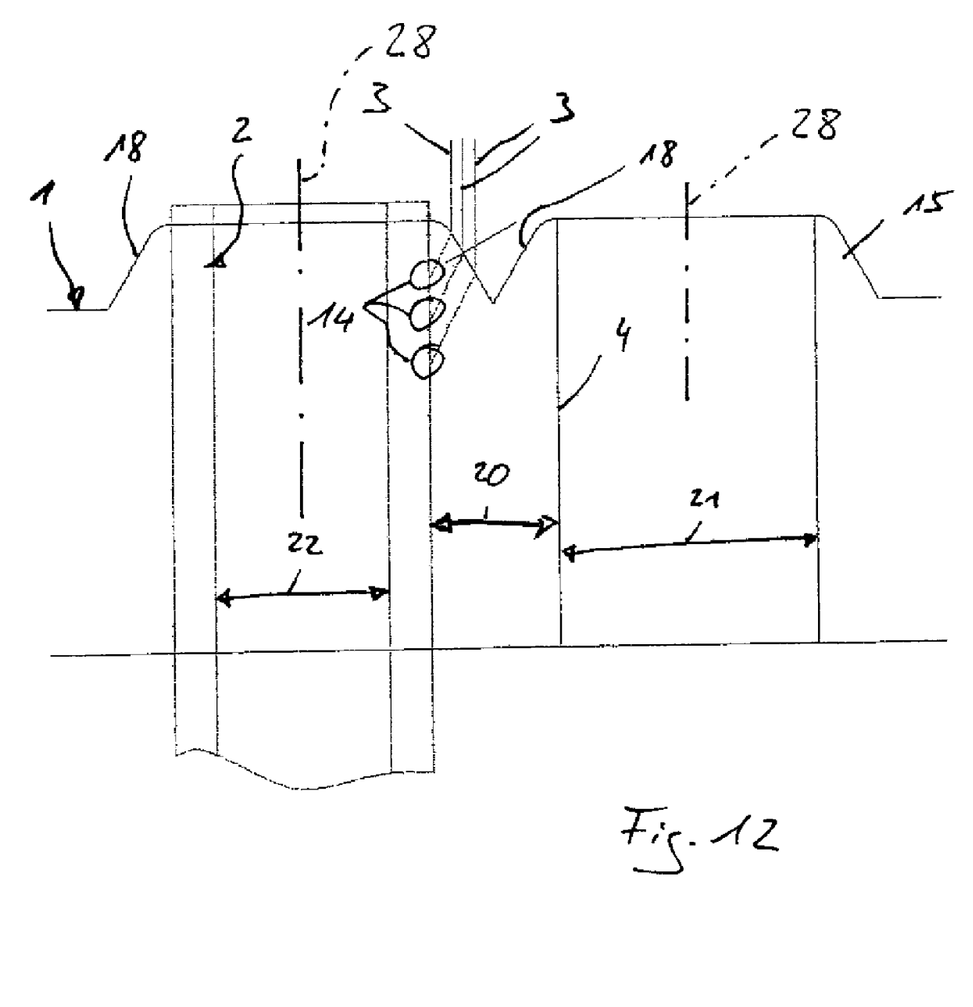
FIG. 12 shows a view as in FIG. 11, but for a further embodiment.

According to FIG. 12, the positions of the laser beam 3 along the refraction face 18 can be varied, whereby a depth effect for the weld seam to be generated can be realized. For example, a weld seam can be realized which is relatively wide in axial direction of the pipe 2. In FIG. 12, three positions which are different in radial direction are exemplarily shown for the laser beam 3, whereby three weld locations 14 can be reached which, at their borders, can flow into each other.

It can also be seen in FIG. 12 that adjacent pipes 2 can be arranged extremely close to each other. For example, their distance 20 is less than their outer diameter 21 or less than their inner diameter 22.

Figure 13:
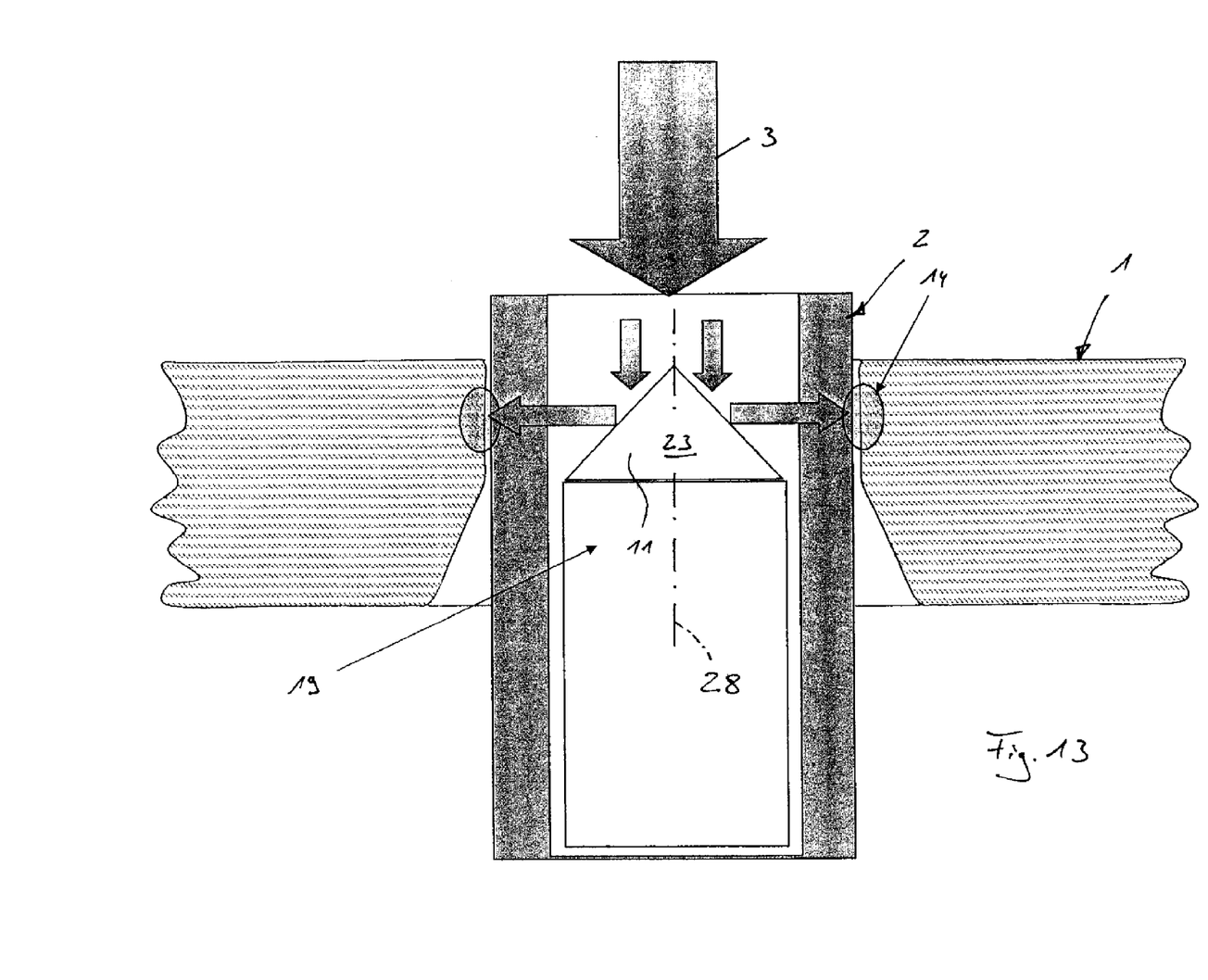
FIG. 13 shows a view as in FIG. 1, but for a further embodiment.

While in the previously introduced embodiments, the reflector faces 11 were available directly on the carrier plate 1 at least during the welding process, FIG. 13 now shows an embodiment in which a reflector 19 is used again which, however, is not integral part of the carrier plate 1. The reflector 19 is rather assigned here to the pipe 2. For this, the reflector 19 forms a separate component which is inserted into the pipe 2 for the welding process. In this embodiment, the pipe 2 is designed with a higher permeability for the laser beam 3, while the carrier plate 1 is designed absorbing for the laser beam 3. The reflector 19 is formed pin-shaped here and carries a reflector head 23 onto which a plurality of reflector faces 11 can be formed. The laser beam 3 can then target the individual reflector faces 11 and expose them to different angles in such a manner that finally a closed annular weld seam between carrier plate 1 and pipe 2 can be formed. In addition, it is principally possible to work with only one single reflector face 11 on the reflector head 23, wherein then the reflector 19 can be driven in a rotating manner, whereby with an appropriate configuration, for the laser beam 3, which is essentially stationary, an annular run can be realized to produce the desired closed annular weld seam. For example, the reflector head 23 can be realized in that the pin-shaped cylindrical body of the reflector 19 is cut at an angle of about 45° with respect to its longitudinal direction. Hereby, a reflector face 11 is created which, upon axial impingement of the laser beam 3, can generate a substantially radially deflected run 12 for the laser beam 3. By rotating the reflector 19 coaxial to the longitudinal center axis 28 of the pipe 2, the run or the point of impingement of the laser beam 3 on the carrier plate 1 moves in a circle and forms a closed ring.

Figure 14:
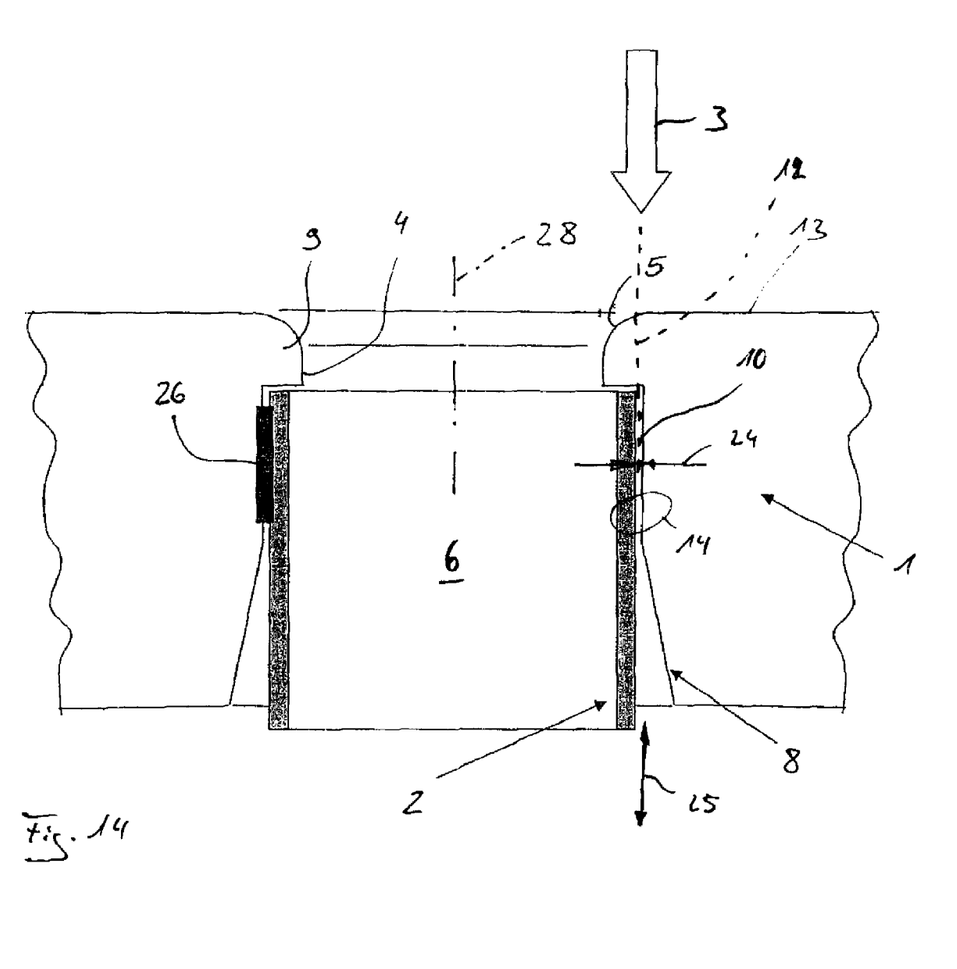
FIG. 14 shows a view as in FIG. 1, but for an alternative embodiment.

In the embodiment shown in FIG. 14, the two plastic parts, here the carrier plate 1 and the pipe 2, are designed semi-absorbing. This means that each of these plastic parts 1, 2 have at least a certain absorbability for the laser beam 3. Here, at least the carrier plate 1 is not fully absorbing but has at least a partial permeability for the laser beam 3. For carrying out the welding method, the two components 1, 2 are positioned to each in such a manner that between them, thus between the carrier plate 1 and the pipe 2, a gap 10 is generated again (compare FIG. 1). This gap 10, however, has a predetermined gap width 24 which is to be measured radially with respect to the longitudinal center axis 28 of the pipe 2. The laser beam 3 is now irradiated parallel to the gap's 10 extension direction 25, which extends transverse to the gap width 24, into the gap 10. The mentioned extension direction 25 is indicated in FIG. 14 by means of a double arrow and extends parallel to the longitudinal center axis 28 of the pipe 2. The laser beam 3 is hence irradiated parallel to the longitudinal center axis 28 of the pipe 2 into the gap 10. In order that now the desired weld joint between the pipe 2 and the carrier plate 1 can be generated, the gap width 24 and the laser beam 3 are precisely correlated. In particular, the gap width 24 is approximately equal to a diameter of the laser beam 3, wherein the diameter is not defined in detail here. In particular, the gap width 24 is maximally 10-times bigger than the diameter of the laser beam 3. In connection with the semi-absorbing materials of the carrier plate 1 as well as of the pipe 2, the desired heating of the wall sections, of the pipe 2 on the one hand, and of the carrier plate 1 on the other hand, which said wall sections are facing each other within the gap 10, takes place. Hereby, the wall sections melt on the surface and can melt together to generate the weld joint 26 indicated in FIG. 14.

In the embodiment shown in FIG. 14, again a collar 9 is provided against which the pipe 2 can abut axially when it is inserted axially into the through-opening 4 of the carrier plate 1. In this respect, the collar 9, hence an integral part of the carrier plate 1, covers the gap 10 with respect to the carrier plate's 1 upper side 13 or outer side 13 facing away from the pipe 2. It is remarkable now that the laser beam 3 can be irradiated through this region (collar 9) of the carrier plate 1 and into the gap 10. This is made possible by means of the semi-absorbing or semi-transparent characteristic of the material selected for the carrier plate 1.

The invention claimed is:

1. A method for laser welding at least two components constructed of plastic, comprising:
   providing a first component which at least in certain regions, has a relatively high permeability for a laser beam used during laser welding such that the first component is generally permeable for the laser beam,
   providing a second component which at least in certain regions, has a relatively low permeability for the laser beam used during laser welding such that the second component is generally absorbable of the laser beam,
   positioning the two components relative to each other in such that between the two components, a gap with a predetermined gap width is present, wherein the gap is covered by a selected one of the two components and that the laser beam penetrates through the selected one of the two components into the gap,
   wherein the laser beam is irradiated parallel to a gap extension direction running generally transverse to the gap width into the gap, and
   wherein the laser beam reaches a respective weld location by means of at least one of refraction and reflection during laser welding.

2. The method according to claim 1, further comprising forming at one of on and in the first component, at least one reflector face which deflects the laser beam by means of reflection to the respective weld location.

3. The method according to claim 2, wherein the laser beam impinges from outside on the reflector face and reaches the respective weld location passing through a region of the first component.

4. The method according to claim 3, wherein the respective reflector face has at least one of a reflective coating and works with total reflection.

5. The method according to claim 3, wherein the laser beam is configured with respect to at least one of:
   i. power of the laser beam,
   ii. a light path from the at least one respective reflector face and at least one refraction face, respectively, and
   iii. at least one of the respective weld location, and a beam angle in at least one of the reflector face, and the at least one refraction face;
   such that at different weld locations approximately equal welding parameters are present.

6. The method according to claim 2, wherein the laser beam impinges from inside on the reflector face and reaches the respective weld location from inside the first component.

7. The method according to claim 6, wherein the laser beam is configured with respect to at least one of:
   i. power of the laser beam,
   ii. a light path from the at least one respective reflector face and at least one refraction face, respectively, and
   iii. at least one of the respective weld location, and a beam angle in at least one of the reflector face, and the at least one refraction face;
   such that at different weld locations approximately equal welding parameters are present.

8. The method according to claim 2, wherein the respective reflector face has at least one of a reflective coating and works with total reflection.

9. The method according to claim 2, wherein the laser beam is configured with respect to at least one of:
   i. power of the laser beam,
   ii. a light path from the at least one respective reflector face and at least one refraction face, respectively, and iii. at least one of the respective weld location, and a beam angle in at least one of the reflector face, and the at least one refraction face;

such that at different weld locations approximately equal welding parameters are present.

10. The method according to claim 1, further comprising a plurality of second components, wherein a reflector is used to lead the laser beam successively to a plurality of different weld locations on one of the same second component and a plurality of different second components.

11. The method according to claim 10, wherein the reflector has a plurality of reflector faces which are assigned to different weld locations.

12. The method according to claim 11, wherein one of the following is selected:
   i. that the reflector is integrally formed on the first component,
   ii. that the reflector is permanently attached to the first component, and
   iii. that the reflector is positioned relative to the first component only for welding.

13. The method according to claim 10, wherein one of the following is selected:
   i. that the reflector is integrally formed on the first component,
   ii. that the reflector is permanently attached to the first component, and
   iii. that the reflector is positioned relative to the first component only for welding.

14. The method according to claim 1, wherein the laser beam is configured with respect to at least one of:
   i. power of the laser beam,
   ii. a light path from one of a respective reflector face and at least one refraction face, respectively, and
   iii. at least one of the respective weld location, and a beam angle in at least one of the reflector face, and the at least one refraction face such that at different weld locations approximately equal welding parameters are present.

15. The method according to claim 14, wherein the laser beam is configured with respect to the power of the laser beam, wherein the power of the laser beam is configured with respect to pulse frequency and amplitude.

16. The method according to claim 1 wherein for one of on and in the first component, at least one refraction face is formed, wherein the laser beam impinging from outside on the at least one refraction face penetrates at the at least one refraction face into the first component and reaches the respective weld location from inside the first component.

17. The method according to claim 1, wherein the first component is a carrier plate and the second component is a pipe.

18. A method for laser welding two components constructed of plastic, comprising:
   providing two components having an absorbing effect for a laser beam used during laser welding, and
   positioning the two components relative to each other in such that between the two components, a gap with a predetermined gap width is present, wherein the gap is covered by a selected one of the two components and that the laser beam penetrates through the selected one of the two components into the gap,
   wherein the laser beam is irradiated parallel to a gap extension direction running generally transverse to the gap width into the gap.

19. The method according to claim 18, wherein the gap width is selected from one of:
   i. approximately equal to a diameter of the laser beam, and
   ii. maximally up to about 10-times bigger than the diameter of the laser beam.

20. A method for laser welding two components constructed of plastic, comprising:
   providing two components having an absorbing effect for a laser beam used during laser welding, and
   positioning the two components relative to each other in such that between the two components, a gap with a predetermined gap width is present,
   wherein the laser beam is irradiated parallel to a gap extension direction running generally transverse to the gap width into the gap, and
   wherein the gap width is selected from one of:
   i. approximately equal to a diameter of the laser beam, and
   ii. maximally up to about 10-times bigger than the diameter of the laser beam.

* * * * *